United States Patent
Tarokh et al.

(10) Patent No.: US 9,282,568 B2
(45) Date of Patent: Mar. 8, 2016

(54) METHOD AND SYSTEM FOR DYNAMIC, JOINT ASSIGNMENT OF POWER AND SCHEDULING OF USERS FOR WIRELESS SYSTEMS

(71) Applicant: FutureWei Technologies, Inc., Plano, TX (US)

(72) Inventors: Vahid Tarokh, Cambridge, MA (US);
Gamini Senarath, Ottawa (CA);
Ho-Ting Cheng, Stittsville (CA);
Peiying Zhu, Kanata (CA)

(73) Assignee: Futurewei Technologies, Inc., Plano, TX (US)

(*) Notice: Subject to any disclaimer, the term of this patent is extended or adjusted under 35 U.S.C. 154(b) by 591 days.

(21) Appl. No.: 13/649,038

(22) Filed: Oct. 10, 2012

(65) Prior Publication Data

US 2013/0130707 A1 May 23, 2013

Related U.S. Application Data

(60) Provisional application No. 61/561,679, filed on Nov. 18, 2011.

(51) Int. Cl.
*H04W 72/12* (2009.01)
*H04W 72/04* (2009.01)
*H04W 52/34* (2009.01)

(52) U.S. Cl.
CPC ............ *H04W 72/121* (2013.01); *H04W 52/34* (2013.01); *H04W 72/0426* (2013.01); *H04W 72/0473* (2013.01)

(58) Field of Classification Search
CPC . H04W 52/346; H04W 52/34; H04W 52/343; H04W 72/0473; H04W 72/12; H04W 52/367; H04W 28/08; H04W 52/26; H04W 52/283; H04W 52/30; H04W 52/365; H04W 52/38; H04B 7/0408
USPC ........................................................ 455/522
See application file for complete search history.

(56) References Cited

U.S. PATENT DOCUMENTS 7,042,856 B2 * 5/2006 Walton .................. H04W 16/04
   370/329
8,000,284 B2 * 8/2011 Lott et al. ...................... 370/318

(Continued)

OTHER PUBLICATIONS

Tarokh, V., "Dynamic Joint Power, Frequency Allocation and Scheduling for 4G and Beyond Cellular Systems," Nov. 15, 2011, 38 pages.

(Continued)

*Primary Examiner* — Matthew Sams
(74) *Attorney, Agent, or Firm* — Slater & Matsil, L.L.P.

(57) ABSTRACT

A method for dynamically determining power and scheduling assignments in a communications network includes selecting, by a controller, a mobile station in each cell to define a mobile station set, determining, by the controller, a power allocation for each of the mobile stations in the mobile station set, calculating, by the controller, a global utility function by evaluating a contribution from each of the mobile stations in the mobile station set in accordance with the power allocation, repeating, by the controller, the selecting, the determining, and the calculating steps a predetermined number of times to generate additional ones of the global utility function, and choosing, by the controller, the mobile station set corresponding to the global utility function having a particular value for a resource block of a frame. The method may also include repeatedly dividing a user set into clusters to obtain a best power allocation.

30 Claims, 4 Drawing Sheets

(56) References Cited

U.S. PATENT DOCUMENTS

| | | | |
|---|---|---|---|
| 8,351,359 B2* | 1/2013 | Heo | H04W 52/365 370/310 |
| 8,588,841 B2* | 11/2013 | Mizuguchi | 455/522 |
| 8,731,497 B2* | 5/2014 | Backman et al. | 455/127.1 |
| 2003/0003921 A1* | 1/2003 | Laakso | 455/453 |
| 2003/0064741 A1* | 4/2003 | Silva et al. | 455/522 |
| 2006/0246935 A1* | 11/2006 | Iochi et al. | 455/522 |
| 2008/0102881 A1* | 5/2008 | Han et al. | 455/522 |
| 2009/0264142 A1* | 10/2009 | Sankar et al. | 455/501 |
| 2010/0034151 A1* | 2/2010 | Alexiou et al. | 370/329 |
| 2010/0296470 A1* | 11/2010 | Heo | H04W 52/365 370/329 |
| 2011/0275405 A1 | 11/2011 | Backman et al. | |
| 2013/0130707 A1* | 5/2013 | Tarokh et al. | 455/452.1 |
| 2014/0018115 A1* | 1/2014 | Zhuang | 455/501 |

OTHER PUBLICATIONS

Search Report and Written Opinion of the International Searching Authority for International Application No. PCT-US12-65908, applicant Huawei Technologies Co., Ltd., mailed Feb. 4, 2013, 9 pages.

Xin, et al., "Joint scheduling and power-allocation for interference management in wireless networks," IEEE 56$^{th}$ Vehicular Technology Conference, Fall 2002, pp. 1892-1896.

\* cited by examiner

METHOD AND SYSTEM FOR DYNAMIC, JOINT ASSIGNMENT OF POWER AND SCHEDULING OF USERS FOR WIRELESS SYSTEMS

CROSS-REFERENCE TO RELATED APPLICATIONS

This application claims the benefit of U.S. Provisional Application No. 61/561,679, filed on Nov. 18, 2011, entitled "A Method and System for Dynamic, Joint Assignment of Power and Scheduling of Users for Wireless Systems," which application is hereby incorporated herein by reference.

TECHNICAL FIELD

The present invention relates to a method and system for wireless communications, and, in particular embodiments, to a method and system for dynamic, joint assignment of power and scheduling of users for wireless systems.

BACKGROUND

Interference is one obstacle to high spectral efficiency cellular communications. Power allocation/control for transmission and picking the best users to schedule is one way to improve performance (other methods include COMP, MIMO, IC). Inter-cell interference control (ICIC) can be accomplished in several ways. One way is to adopt a static power pattern for each eNodeB (eNB) such that each individual eNB schedules users to take advantage of different power levels of the neighboring eNBs depending on the interference they receive from those eNBs. This can be made slow adaptive per loading and interference levels. Many joint power control and scheduling schemes also have been proposed. See, for example, see Liu Xin, E. K. P Chong, and N. B. Shroff, *Joint Scheduling and Power-Allocation for Interference Management in Wireless Networks*, Proceedings of IEEE VTC-Fall 2002. The performance of a centralized joint power control and scheduling scheme generally is better as it can provide near optimal performance. But the complexity of such a scheme makes it very unlikely to be implemented.

SUMMARY

An embodiment method for dynamically determining power and scheduling assignments in a communications network including selecting, by a controller, a mobile station in each cell using a randomization algorithm to define a mobile station set, determining, by the controller, a power allocation for each of the mobile stations in the mobile station set, calculating, by the controller, a global utility function by evaluating a contribution to a global utility from each of the mobile stations in the mobile station set in accordance with the power allocation, repeating, by the controller, the selecting, the determining, and the calculating steps a predetermined number of times to generate additional ones of the global utility function, and choosing, by the controller, the mobile station set corresponding to the global utility function having a particular value for a resource block of a frame.

An embodiment method for dynamically determining power and scheduling assignments in a communications network including selecting, by a controller, a first mobile station in each cell using a randomization algorithm to define a first mobile station set, determining, by the controller, a first power allocation for each of the first mobile stations in the first mobile station set, calculating, by the controller, a first global utility function by evaluating a contribution to a first global utility for each of the first mobile stations in the first mobile station set in accordance with the first power allocation, selecting, by the controller, a second mobile station in each cell using the randomization algorithm to define a second mobile station set, determining, by the controller, a second power allocation for each of the mobile stations in the second mobile station set, calculating, by the controller, a second global utility function by evaluating a contribution to a second global utility for each of the mobile stations in the second mobile station set in accordance with the second power allocation, and choosing, by the controller, between the first mobile station set and the second mobile station set for a first resource block of a frame in accordance with the first global utility function and the second global utility function.

An embodiment controller for dynamically determining power and scheduling assignments in a communications network including a memory storing a look up table, the look up table in accordance with a number of base stations in the communications network and pathlosses, and a processor operably coupled to the memory, the processor configured to select a mobile station in each cell using a randomization algorithm to define a mobile station set, to determine a power allocation for each of the mobile stations in the mobile station set, to calculate a global utility function by evaluating a contribution to a global utility from each of the mobile stations in the mobile station set in accordance with the power allocation, to repeat the selecting, the determining, and the calculating steps a predetermined number of times to generate additional ones of the global utility function, and to choose the mobile station set corresponding to the global utility function having a particular value.

An embodiment method for dynamically determining power and scheduling assignments in a communications network includes receiving, by a controller, pathloss information from a base station in each cell in accordance with transmissions with corresponding mobile stations, determining, by the controller, a power allocation for each resource block from each of the base stations using an algorithm, and sending, by the controller, the power allocation to each of the base stations for use by the base stations in scheduling the mobile stations.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely, 3rd Generation Partnership Project (3GPP) Long Term Evolution (LTE) communications network. The concepts in the disclosure may also apply, however, to other types of communications networks and/or wireless communications such as, for example, $4^{th}$ Generation (4G) cellular systems, LTE-Advanced, and so on.

Figure 1:
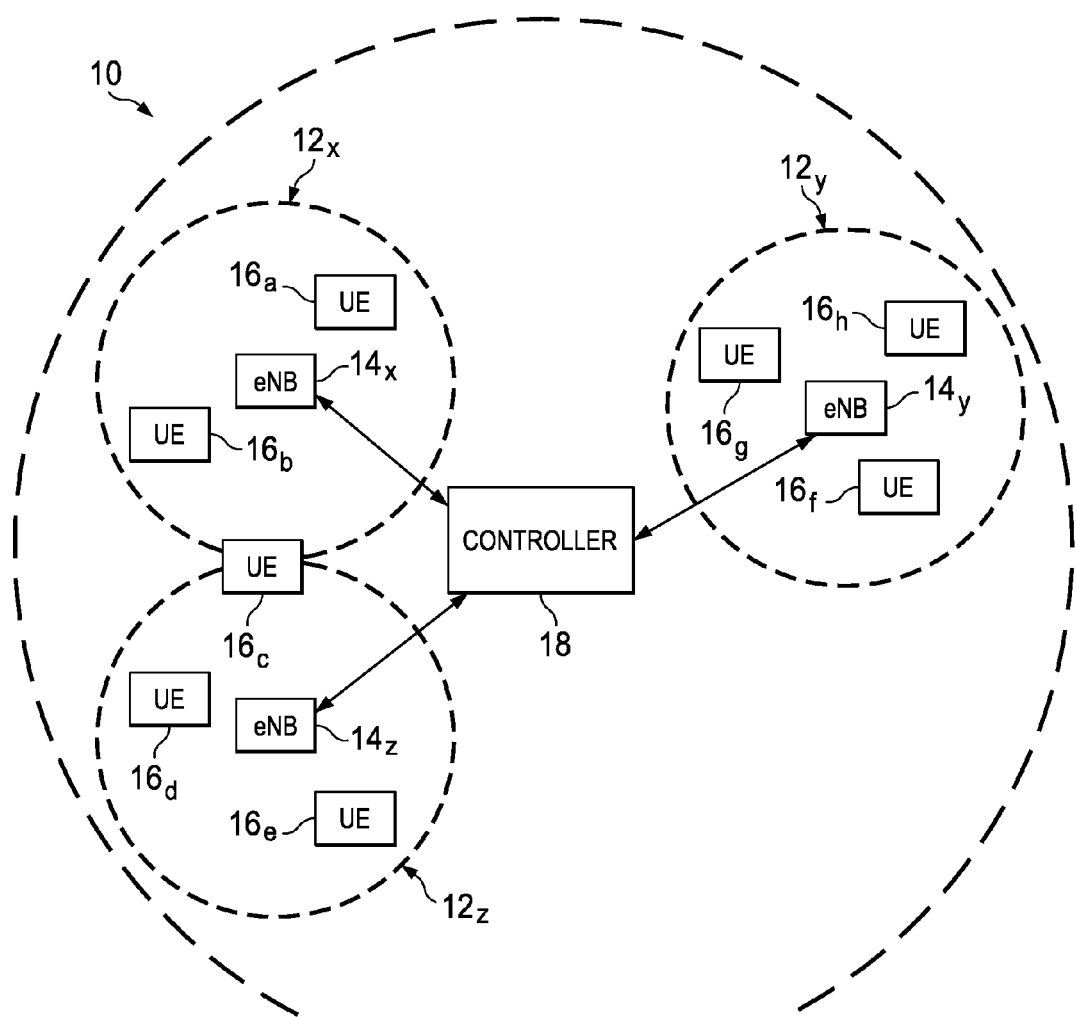
FIG. 1 illustrates an embodiment communications network where base stations serving several mobile stations are scheduled and provided power allocations by a controller.

Referring now to FIG. 1, a communications network 10 is illustrated. The communications network 10 generally includes a plurality of cells 12 (e.g., a macro cell, a micro cell, a pico cell, a femto cell, etc.). In FIG. 1, the cells 12 in the communications network 10 have been labeled with a subscript to differentiate them from each other (e.g., $12_x$, $12_y$, and $12_z$). Each of the cells 12 includes a base station 14 (e.g., a node B, an evolved node B (eNB), etc.). In FIG. 1, the base stations 14 have also been labeled with a subscript to differentiate them from each other (e.g., $14_x$, $14_y$, and $14_z$). The base stations 14 each serve the mobile stations 16 (e.g., user equipments (UEs), etc.) that are currently located within their cell 12. For the purpose of clarity, the mobile stations 16 have been labeled with a subscript to differentiate them from each other (e.g., $16_a$-$16_h$).

In circumstances where each of the base stations 14 determines its own power allocation and scheduling for transmissions to the mobile stations 16 within its own cell 12 without regard to or consulting with neighboring base stations 14, undesirable inter-cell interference may occur. To remedy this, the base stations 14 in the communication network 10 may be coupled to each other through wired or wireless links. When connected to each other, the base stations 14 in neighboring or adjacent cells 12 may communicate with each other to collectively determine the power allocation and scheduling for transmissions to all of the mobile stations 16 in the communications network 10 in an effort to reduce the inter-cell interference. Unfortunately, this inter-cell interference coordination approach is not without disadvantages (e.g., large overhead, not very dynamic, etc.).

To resolve the inter-cell interference issues, in an embodiment a controller 18 is incorporated into the communications network 10. The controller 18 is communicatively coupled to each of the base stations 14 in the communications network 10. As such, and as will be more fully explained below, the controller 18 is able to collectively determine the power and scheduling for all of the base stations 14 (or some subset of base stations) for transmissions to the mobile stations 16. In doing so, the controller 18 is able to beneficially mitigate or eliminate inter-cell interference.

Figure 2:
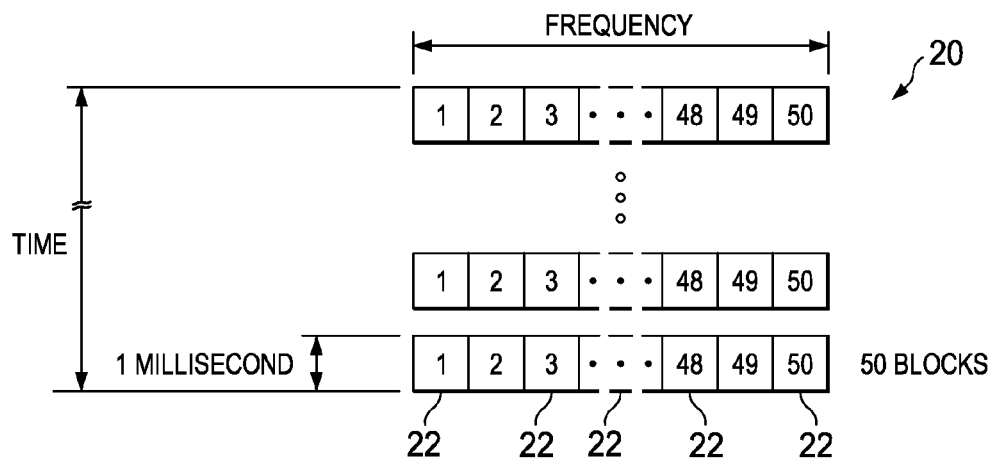
FIG. 2 illustrates a plurality of resource blocks in a frame used by the base stations of FIG. 1 while communicating with the mobile stations.

Referring collectively to FIGS. 1-2, each of the base stations 14 transmits to the mobile stations 16 located in its cell 12 using a frame 20. In an embodiment, the frame 20 depicted in FIG. 2 represents one millisecond (1 ms) and includes fifty individual resource blocks 22. Therefore, during communication between one of the base stations 14 and one of the mobile stations 16 in FIG. 1, one of the frames 20 is transmitted each millisecond. In other embodiments, the frame 20 may represent a different amount of time and include more or fewer resource blocks 22.

Referring to FIG. 2, each resource block 22 in the frame 20 is allocated to a mobile station, such as the mobile stations 16 depicted in FIG. 1. Notably, one of the mobile stations 16 may be assigned several of the resource blocks 22. For example, resource block "1" in FIG. 2 may be assigned to mobile station $16_a$ in FIG. 1, resource block "2" may be assigned to mobile station $16_b$, resource blocks "3" and "4" may be assigned to mobile station $16_c$, and so on and so forth until all of the available resource blocks have been allocated. In another example, resource blocks "1-30" may be assigned to mobile station $16_d$ and resource blocks "31-50" may be assigned to mobile station $16_h$. In yet another example, resource blocks "1-50," which constitutes all of the available resource blocks for the 1 ms frame 20, may be assigned to mobile station $16_f$. This operation of assigning resource blocks 22 to the mobile stations 16 for each frame 20 may be referred to as scheduling and is performed by the controller 18. Notably, the resource blocks 22 are re-assigned for each 1 ms frame 20.

Each of the resource blocks 22 is capable of carrying data intended for the mobile station 16 assigned to that particular resource block 22. Therefore, each of the resource blocks 22 may be thought of as a frequency within a frequency band. In an embodiment, transmissions occur in a frequency band of about 5 MHz to about 10 MHz.

Because each of the base stations 14 in the communications network 10 of FIG. 1 uses the same format for the frame 20, interference between adjacent cells 12 may occur. This is particularly true for mobile stations 16 at or proximate a boundary of adjacent cells 12 such as, for example, mobile station $16_c$ located at the border of cell $12_x$ and cell $12_z$.

One method of combatting interference between adjacent cells 12 is known as inter-cell interference coordination (ICIC). As an example of this practice, base station $14_x$ of FIG. 1 transmits to mobile station $16_b$, because of its close proximity, with relatively low power when using resource block 1 (FIG. 2). At the same time, base station $14_z$ transmits to mobile station $16_c$, which is far away from base station $14_z$, with relatively high power when using resource block 1. By operating in this manner, interference is mitigated or eliminated with regard to resource block 1 when used simultaneously by base station $14_x$ and base station $14_z$.

In an embodiment, the controller 18 of FIG. 1 is able to perform the ICIC process globally and for all of the base stations 14 in the communications network 10. In other words, the controller 18 determines the power allocation to be used by each of the base stations 14 when transmitting to each of the mobile stations 16 with regard to each resource block 22 in each 1 ms frame 20. In other words, the controller 18 coordinates transmissions from each of the base stations 14 to improve parameters of the communications network 10 such as, for example, throughput, signal to noise ratio, and so on.

Figure 3:
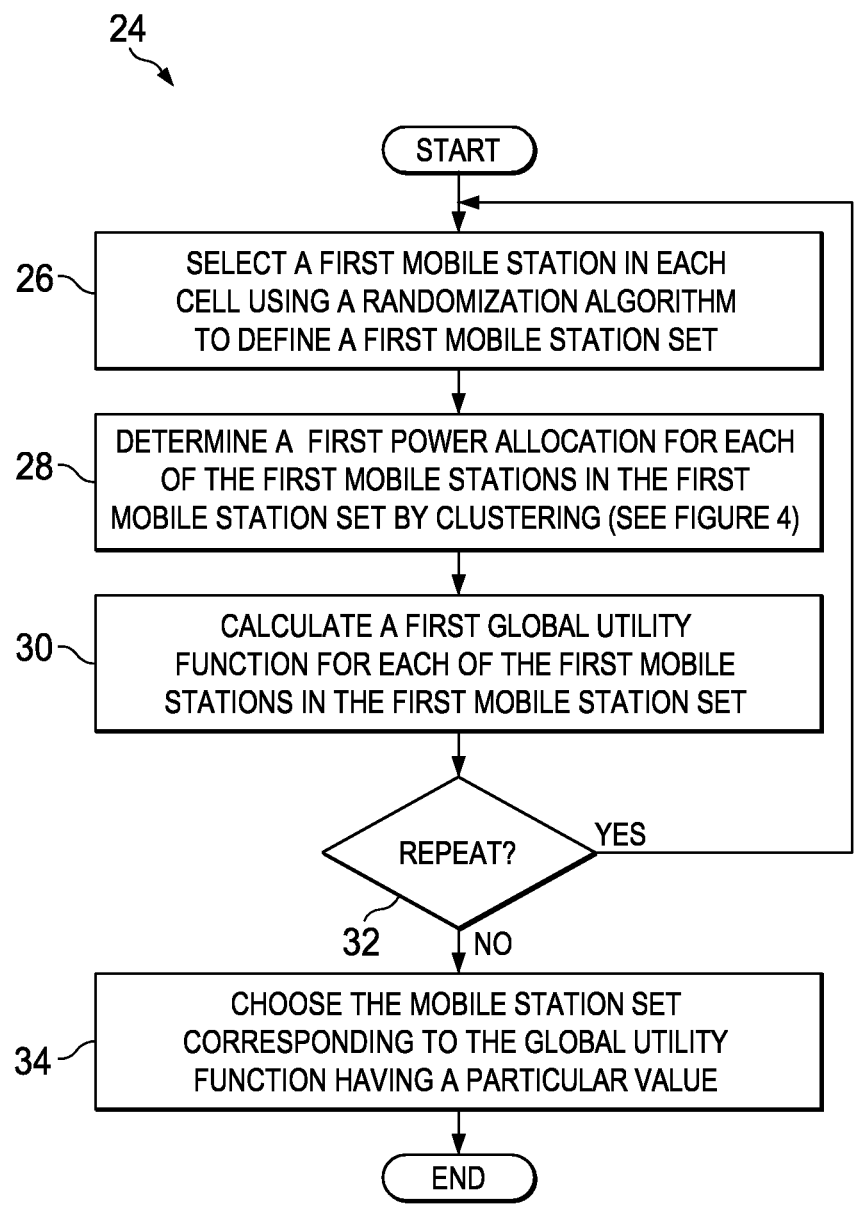
FIG. 3 illustrates a flow diagram for joint power allocation and scheduling.

Referring now to FIGS. 1 and 3, an embodiment method 24 of coordinating transmissions in the communications network 10 of FIG. 1 using the controller 18 is illustrated. As will be more fully explained below, the method 24 involves dynamically determining power and scheduling assignments for multiple mobile stations 16 and base stations 14 for each resource block 22 in each 1 ms frame 20. The method 24 is repeated in order to determining power and scheduling assignments for resource blocks 22 in subsequent frames 20.

In block 26, a single one of the mobile stations 16 in each cell 12 in the communications network 10 is selected by the controller 18 using a randomized algorithm. The single mobile station 16 in each cell 12 may be referred to as a candidate mobile station. The set of these candidate mobile stations 16, one from each cell 12, may be referred to as a user equipment vector (UEV). By way of example, the initial UEV for communications network 10 of FIG. 1 would include three mobile stations (e.g., mobile station $16_a$, mobile station $16_d$, mobile station $16_g$) because there are three base stations 14 defining three cells 12.

In an embodiment, the single one of the mobile stations 16 in each cell 12 in the communications network 10 is selected by the controller 18 according to a local proportionally fair allocation. For example, in the proportionally fair allocation the mobile stations 16 may be randomly selected by maximum throughput and considering the location of the mobile stations 16 in the cell 12. In an embodiment, the local proportionally fair allocation is determined using a biased coin process. By way of example, if three mobile stations 16 are considered, the chance of randomly choosing one of the mobile stations is determined by the following: $16_a/(16_a+16_b+16_c)$.

In an embodiment, the particular mobile stations 16 that will be included in the mobile station set may be selected using a uniform random process. In an embodiment, the mobile stations 16 may be selected by considering the best mobile stations 16 in accordance with a local proportionally fair allocation and then selecting randomly form those best mobile stations. In other embodiments, other methods or processes of randomly selecting mobile stations 16 may be implemented.

Figure 4:
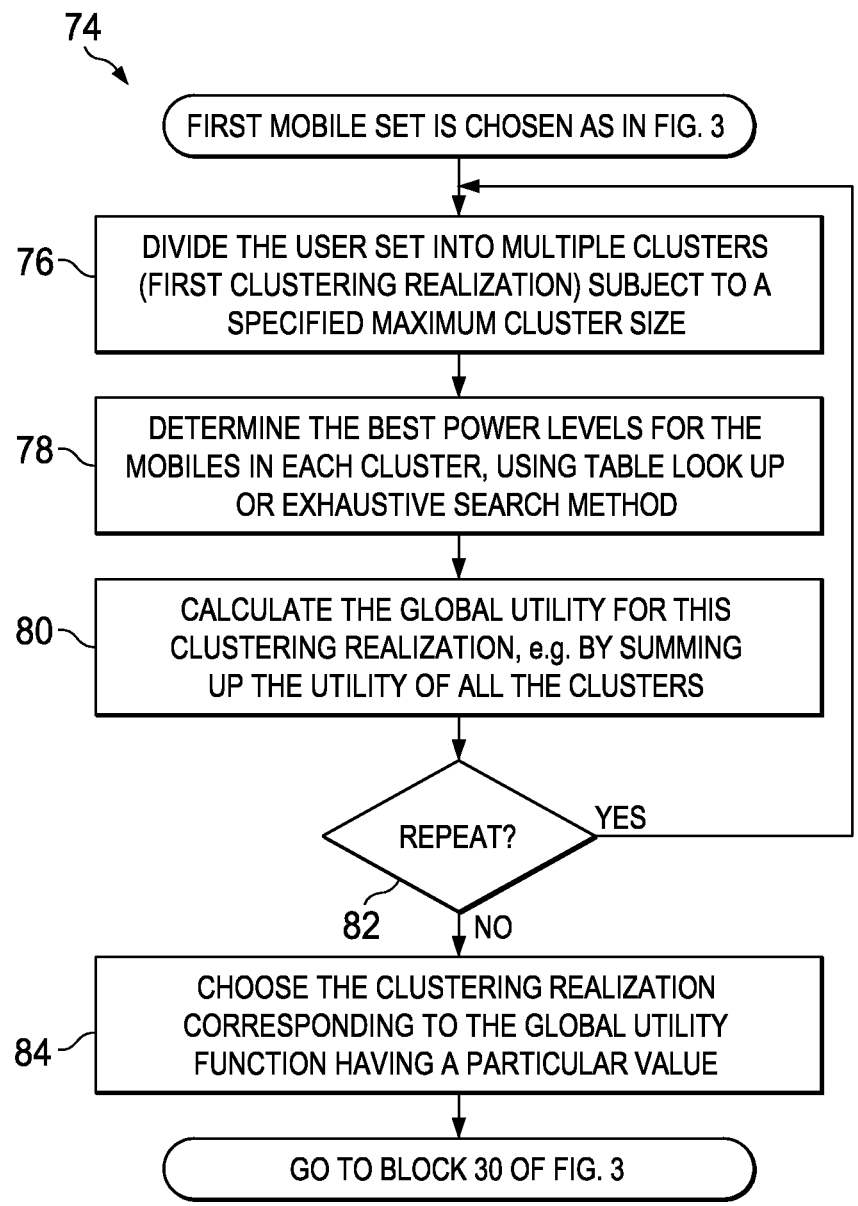
FIG. 4 illustrates a flow diagram for clustering from the joint power allocation and scheduling of FIG. 3.

Once the mobile station set (i.e., the UEV) has been defined, in block 28 a power allocation for each of the mobile stations 16 in the mobile station set is determined by the controller 18. The steps for determining the power allocation for a given mobile station set is explained in FIG. 4. In an embodiment, the power allocation is determined by dividing the mobile station set into subsets or clusters of mobile stations called a cluster realization 16, subject to a specified maximum number of mobile stations in each cluster. This is described in block 76. This may be done to simplify mathematical calculations.

As an example, assume for the purpose of discussion that the mobile station set includes ten of the mobile stations 16, each having six power levels, in the communications network 10. If so, an exhaustive power allocation determination calculates and considers $10^6$ (or 1,000,000) combinations. If, however, the mobile station set is divided into two subsets of 5 each, then 56 (or 15,625) combinations are needed to be evaluated and considered for each subset. Therefore, when there are a large number of base stations the clustering simplifies the calculation significantly. In block 78, a determination of the best power levels for the mobile stations in the cluster could be done either using exhaustive search or using a table look up method to achieve a given utility value (e.g. to maximize the utility). When evaluating the best power levels the power levels of the other clusters could be assumed as the power levels used in the previous iteration. The final power levels may be obtained through several iterations.

In block 80, the global utility function for the clustering realization is calcluated. In an embodiment, the calculation includes summing the utility of all the clusters. As shown in block 82, the process may be repeated a pre-determined number of times using redefined cluster realizations whereby the mobile stations 16 are rearranged into different groups, and the best power levels and the associated utility for each cluster realization is obtained. Then, in block 84 the best cluster realization and associated power levels which gives a particular value of utility is selected.

In an embodiment, the act of clustering may be done purely randomly subject to a maximum number of users (depend on the manageable number or table size) or done in accordance with the interference among the users. In the latter scenario, the clustering is done in such a way to minimize the interference among the clusters. Depending on the starting point, there may be several clustering outcomes.

In an embodiment, the power allocation is determined using a look up table, either with or without the use of subsets noted above. The look up table may be in accordance with the number of base stations 14 in the communications network 10 and/or a pathloss between each of the base stations 14 and the mobile stations 16. The pathloss set may be referred to as a channel matrix.

The channel matrix may be obtained using the observed path losses of the existing users of the current base station set up, which represents all the possible path loss combinations. These path loss occurrences could be quantized in the multi-dimensional space to match the combinations, which results in the same best power combinations into one quantized combination. This quantized table could be prepared off-line and stored to be searched when the optimizations are done during actual power allocation and scheduling as explained before.

In an embodiment, the look up table is employed to determine, for example, the best transmission rates and power vectors for the mobile stations 16. In an embodiment, another method of developing the look-up table may be used. In particular, the look table may be constructed as a generic look up table where all the practically possible path loss combinations are used for the above quantization.

Details regarding the generation of the look up table, an optimality proof for a PC scheme, and a method to reduce the search space, as well as other embodiments, are provided in Vahid Tarokh, *Dynamic Joint Power, Frequency Allocation and Scheduling for 4G and Beyond Cellular Systems*, Nov. 15, 2011, which is included herewith as part of this patent application.

Referring again to FIGS. 1-4, after the power allocation for each of the mobile stations 16 in the mobile station set is determined by the controller 18, in block 30 a global utility function is calculated by the controller 18 for each of the mobile stations 16 in the mobile station set in accordance with the power allocation. Thereafter, as reflected by block 32 in FIG. 3, the steps of selecting in block 26, determining in block 28, and calculating in block 30 may be repeated or performed iteratively. In an embodiment, the steps are repeated in accordance with a predetermined value, until a threshold is reached, and the like.

Next, as shown in block 34, the mobile station set corresponding to the global utility function having a particular value (e.g., the largest value) is selected. By way of example, if a first mobile station set has a utility value that is greater than the other mobile station sets, the first mobile station set is selected. In an embodiment, the global utility value is throughput. In an embodiment, the global utility value may be other wireless transmission parameters. Notably, the entire method 24 is repeated for each resource block 22 in the frame 20 until all of the resource blocks 22 have been assigned to one of the mobile stations 16 by the controller 18.

Figure 5:
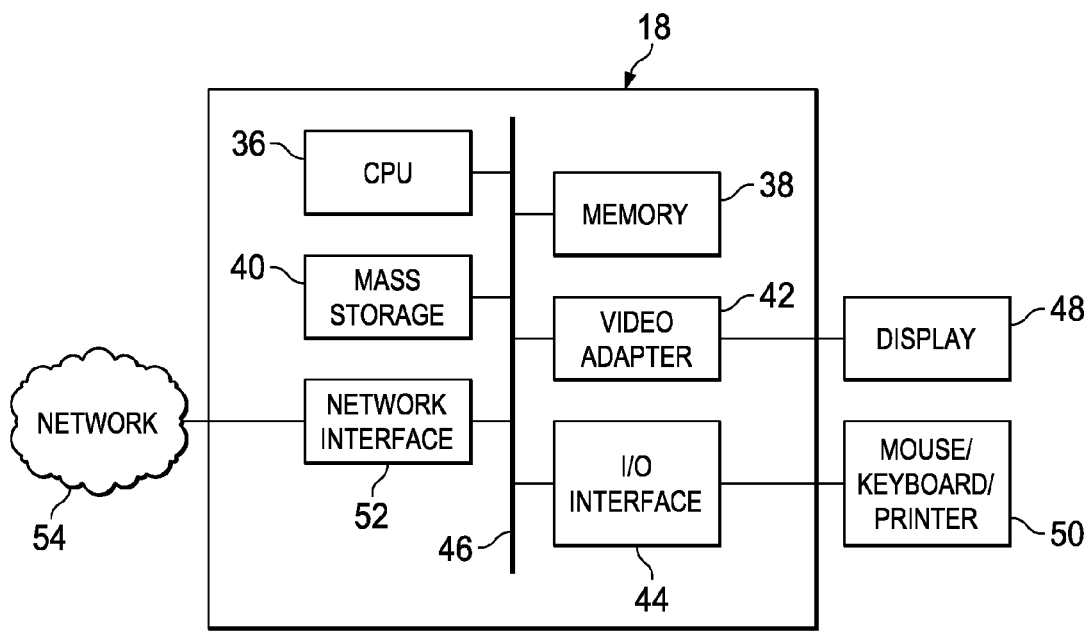
FIG. 5 is a block diagram illustrating a computing platform that may be used for implementing, for example, the devices and methods described herein, in accordance with an embodiment.

FIG. 5 illustrates a block diagram of a controller 18 or other processing system capable of implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, and so on. The processing system may comprise a processing unit equipped with one or more input/output devices, such as a speaker, microphone, mouse, touchscreen, keypad, keyboard, printer, display, and the like. The processing unit may include a central processing unit (CPU) 36, a memory 38, a mass storage device 40, a video adapter 42, and an I/O interface 44 connected to a bus 46.

The bus 46 may be one or more of any type of several bus architectures including a memory bus or memory controller, a peripheral bus, video bus, or the like. The CPU 36 may comprise any type of electronic data processor. The memory 38 may comprise any type of system memory such as static random access memory (SRAM), dynamic random access memory (DRAM), synchronous DRAM (SDRAM), read-only memory (ROM), a combination thereof, or the like. In an embodiment, the memory 38 may include ROM for use at boot-up, and DRAM for program and data storage for use while executing programs.

The mass storage device 40 may comprise any type of storage device configured to store data, programs, and other information and to make the data, programs, and other information accessible via the bus. The mass storage device 40 may comprise, for example, one or more of a solid state drive, hard disk drive, a magnetic disk drive, an optical disk drive, or the like.

The video adapter 42 and the I/O interface 44 provide interfaces to couple external input and output devices to the processing unit. As illustrated, examples of input and output devices include a display 48 coupled to the video adapter 42 and a mouse/keyboard/printer 50 coupled to the I/O interface 44. Other devices may be coupled to the processing unit, and additional or fewer interface cards may be utilized. For example, a serial interface card (not shown) may be used to provide a serial interface for a printer.

The processing unit also includes one or more network interfaces 52, which may comprise wired links, such as an Ethernet cable or the like, and/or wireless links to access nodes or different networks. The network interface 52 allows the processing unit to communicate with remote units via the networks. For example, the network interface 52 may provide wireless communication via one or more transmitters/transmit antennas and one or more receivers/receive antennas. In an embodiment, the processing unit is coupled to a local-area network or a wide-area network 54 for data processing and communications with remote devices, such as other processing units, the Internet, remote storage facilities, or the like.

From the foregoing, it should be recognized that the communications network 10 employs a joint PC and scheduling scheme that provides a near optimal global solution with much less complexity so that it may be operated dynamically to get the best solution for future wireless systems. Embodiments provide a near optimal inter-cell interference control (ICIC) scheme that can be applied to both uplink and downlink. An embodiment provides obtains near optimal results with an intelligent way of using a predetermined power look up table and a dynamic user-based clustering scheme to reduce the complexity. A table look-up method generally reduces the computational complexity of joint multi-cell power allocation and scheduling. Randomized algorithms generally reduce the full search needed over all cells/sectors end-users yet provide near optimum performance.

Embodiments disclosed herein may be utilized in Long Term Evolution (LTE) radio access network (RAN) devices such as cellular handsets, base-stations, eNodeB (eNB). Embodiments may be applied to 4G and Beyond 4G commercial cellular systems, such as LTE advanced, and so on. Embodiments also may be utilized in dynamic to static ICIC schemes, and messaging for centralized control in future standards may be established. For example, femto cell to macro eNB-specific messages and macro eNB to femto messages for power assignment information may be standardized. Embodiments may provide increased capacity, power efficiency, lower complexity and cost reduction.

In an embodiment, a centralized power control algorithm provides the best power levels and scheduling options for each eNB in accordance with the measurements the central point received from individual eNBs. The algorithm functions such that only the best power levels are provided, but each eNB selects its UEs in accordance with local PF.

An embodiment cellular network multi-cell/sector joint power allocation and scheduling method is illustrated in FIG. 1. A table look-up-assisted method maps the channel matrix of a set of end-users (each one in a different corresponding cell/sector) into a joint power and rate allocation vector for a given multi-cell/sector utility function. This method generally is most practical for a small number of cells/sectors. A randomized algorithm approach selects a number of candidates near optimal subsets of end-users (a user in each cell/sector) at each time in each of the aforementioned cells/sectors that nearly optimizes the multi-cell objective function. A randomized method breaks each of the above candidate vectors of end-users into a near optimal union of disjoint subsets (of smaller size each) where the table look-up joint power and rate allocation can be applied to each subset in real time. The best candidate UE vector and the associated best power vector are selected. If there are delays in measurement feedback and or processing this could be implemented in a delayed fashion (apply algorithm outcome in accordance with the information x TTI's delay).

An algorithm for each resource block is provided below:

```
For each RB:
    for ue_vector_iter = 1: max_iter
        Select a UE per each base station based on local pf.
        {Random selection based on the probability evaluated using the
        local pf)}
        Obtain the best power allocation for the UE vector.
        {BSs are Clustered dynamically based on the UEs selected in an
incremental manner so as to maximize the utility. For each cluster best
power allocation is found based on the channel matrix of UEs by looking
at a table}
    end
    Select the best ue_vector with the best power allocation for
scheduling for this RB. And update the throughput.
End.
```

An example clustering scheme that uses exhaustive search for best clustering is provided below.

```
Cluster = BSG (Base Station group)
Initialize BSG (start with each BSG with one eNB).
Repeat
    FOR BSG1 = 1: num_BSG
        FOR BSG2 = 1:num_BSG
            if BSG1 ~= BSG2
                {Try joining two BSGs and find combination providing best
Obj_func}
                Save the best power matrix.
            end
        END
    END
    Find the best two BSGs and merge them.
```

-continued

Until no more BSGs to merge
{This will be continued until all the BSG's reach max_BSG_size or no more BSGs to merge.}

Alternatively, in an embodiment, randomized multiple clustering is used to minimize computing time. In this case, an eNB is picked randomly and then, the best M−1 highest mutually interfering eNBs are clustered together to it. Then another eNB is randomly picked to cluster until no more clustering can be done. Then, the PC is evaluated for each cluster, and this is repeated for K random iterations to find the best.

An embodiment table look up obtains user channel (path loss to all eNBs with large interference) for a large number of representative users in a system. For simulations for a given scenario a large number of users are dropped and these channels are obtained. In practice this may be in accordance with many user logs or many drive tests in a given area. The embodiment normalizes the channel for the interference and noise and limits the channels with impacting neighbors only. Then, for a given cluster size, the embodiment chooses the clusters in accordance with largest mutual interference and finds all the possible channels. Then the embodiment quantizes the channel space in accordance with the closest distance, and for each quantized point finds the optimal power levels and rates. These rates are stored in a table. During actual scheduling time, once users are known, the above table can be used to find the best power levels and data rates.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for dynamically determining power and scheduling assignments in a communications network, comprising:
obtaining, by a controller, the path loss values from each mobile station to its strongest neighbor base stations;
selecting, by the controller, a mobile station in each of a plurality of cells to define a mobile station set for a corresponding one of the cells;
assigning, by the controller, one or more mobile stations to the corresponding one of the cells and a resource block for a time period for a first one of the mobile station sets for communication with the cell corresponding to the first one of the mobile station sets;
determining, by the controller, a power allocation for each of the mobile stations in the mobile station set;
sending an assignment of the resource block and the power allocation to an evolved node B (eNB) in one of the cells;
repeating, by the controller, the selecting, the assigning, and the determining steps a predetermined number of times to generate assignments for a plurality of resource blocks in a time period;
calculating, by the controller, a global utility function by evaluating a contribution to a global utility from each of the mobile stations in the mobile station set in accordance with the power allocation; and
repeating, by the calculating step a predetermined number of times to generate additional ones of the global utility function; wherein the step of selecting comprises choosing, by the controller, the mobile station set that corresponds to the global utility function having a particular value for a resource block of a frame,
wherein the step of determining comprises dividing the mobile station set into subsets, and the power allocation is determined by the subsets, and
wherein during each dividing step in the repeating action, the step of dividing the mobile stations into subsets is performed randomly to form several clustering versions and wherein the power allocation is obtained from the clustering version accordingly.

2. The method of claim 1, wherein the mobile station in each cell is selected using a randomization algorithm.

3. The method of claim 1, wherein the global utility function corresponds to a throughput and the particular value is a largest value of the throughputs corresponding to a plurality of global utility function generated in the calculating step.

4. The method of claim 1, wherein the step of dividing the mobile stations into subsets is performed by associating the mobile stations in accordance with a strongest interference and a maximum cluster size.

5. The method of claim 1, wherein the power allocation for the subsets is in accordance with a number of base stations in the communications network.

6. The method of claim 5, wherein the power allocation for the subsets is in accordance with a number of power levels available from the base stations.

7. The method of claim 1, wherein the power allocation for the subsets is obtained by performing an exhaustive search.

8. The method of claim 1, wherein the power allocation for the subsets is determined using a look up table.

9. The method of claim 8, wherein the look up table is in accordance with a number of base stations in the communications network.

10. The method of claim 8, wherein the look up table is in accordance with a pathloss between a base station and each of the mobile stations.

11. The method of claim 1, wherein the selecting the mobile station in each cell is in accordance with a local proportionally fair allocation.

12. The method of claim 11, wherein the local proportionally fair allocation is in accordance with at least one of a location, a throughput, and a throughput history for the mobile station.

13. The method of claim 11, wherein the local proportionally fair allocation is determined using a biased coin process.

14. The method of claim 11, wherein the local proportionally fair allocation is determined using a uniform random process.

15. The method of claim 11, wherein the local proportionally fair allocation is determined using clusters of the mobile stations from which one of the mobile stations is randomly selected.

16. The method of claim 1, further comprising repeating the selecting, the determining, the calculating, the repeating, and the choosing steps for a subsequent resource block of the frame.

17. The method of claim 1, further comprising sending, by the controller, a message to the eNB instructing the eNB to use the power level, cell assignments, and resource usage for data transmission during the time period.

18. A method for dynamically determining power and scheduling assignments in a communications network, comprising:
selecting, by a controller, a first mobile station in each cell using a randomization algorithm to define a first mobile station set;

determining, by the controller, a first power allocation for each of the first mobile stations in the first mobile station set, the step of determining the power allocation for each of the first mobile stations comprising dividing the first mobile station set into first subsets, the first subsets formed by one of (1) randomly forming several clustering versions and (2) associating the first mobile stations in accordance with a strongest interference and a maximum cluster size;

calculating, by the controller, a first global utility function by evaluating a contribution to a first global utility for each of the first mobile stations in the first mobile station set in accordance with the first power allocation;

selecting, by the controller, a second mobile station in each cell using the randomization algorithm to define a second mobile station set;

determining, by the controller, a second power allocation for each of the second mobile stations in the second mobile station set, the step of determining the second power allocation for each of the second mobile stations in the second mobile station set comprising dividing the second mobile station set into second subsets, the second subsets formed by one of (1) randomly forming several clustering versions and (2) associating the second mobile stations in accordance with a strongest interference and a maximum cluster size;

calculating, by the controller, a second global utility function by evaluating a contribution to a second global utility for each of the mobile stations in the second mobile station set in accordance with the second power allocation; and choosing, by the controller, between the first mobile station set and the second mobile station set for a first resource block of a frame in accordance with the first global utility function and the second global utility function.

19. The method claim 18, wherein the first global utility function and the second global utility function are each a throughput.

20. The method claim 18, wherein the first power allocation and the second power allocation are determined by dividing the first mobile station set and the second mobile station set into subsets.

21. The method claim 20, wherein the step of dividing the first mobile station set and the second mobile station set into subsets is performed randomly.

22. The method claim 20, wherein the step of dividing the first mobile station set and the second mobile station set into subsets is in accordance with at least one of a strongest interference and a maximum cluster size.

23. The method claim 20, wherein the first power allocation and the second power allocation for the subsets is determined using a look up table.

24. The method claim 20, wherein the power allocation for the subsets is obtained by performing an exhaustive search.

25. A controller for dynamically determining power and scheduling assignments in a communications network, comprising:
a non-volatile memory storing a look up table, the look up table in accordance with a number of base stations in the communications network and pathlosses; and
a processor operably coupled to the memory, the processor configured to select a mobile station in each cell using a randomization algorithm to define a mobile station set, to determine a power allocation for each of the mobile stations in the mobile station set, the determining the power allocation comprising dividing the mobile station set into subsets, the subsets formed by one of (1) randomly forming several clustering versions and (2) associating the mobile stations in accordance with a strongest interference and a maximum cluster size, to calculate a global utility function by evaluating a contribution to a global utility from each of the mobile stations in the mobile station set in accordance with the power allocation, to repeat the selecting, the determining, and the calculating steps a predetermined number of times to generate additional ones of the global utility function, and to choose the mobile station set corresponding to the global utility function having a particular value.

26. The controller of claim 25, wherein the global utility function is a throughput and the particular value is a largest of the throughputs.

27. The controller of claim 25, wherein the processor is configured to divide the mobile station set into subsets to determine the power allocation.

28. A method for dynamically determining power and scheduling assignments in a communications network, comprising:
receiving, by a controller, pathloss information from a base station in each cell in accordance with transmissions with corresponding mobile stations;
selecting, by the controller, a mobile station in each of a plurality of cells to define a mobile station set for a corresponding one of the cells;
determining, by the controller, a power allocation for each resource block from each of the base stations according to the pathloss information;
calculating, by the controller, a global utility function by evaluating a contribution to a global utility from each of the mobile stations in the mobile station set in accordance with the power allocation;
repeating, by the calculating step a predetermined number of times to generate additional ones of the global utility function; wherein the step of selecting comprises choosing, by the controller, the mobile station set that corresponds to the global utility function having a particular value for a resource block of a frame; and
sending, by the controller, the power allocation to each of the base stations for use by the base stations in scheduling the mobile stations,
wherein the step of determining comprises dividing the mobile station set into subsets, and the power allocation is determined by the subsets, and
wherein during each dividing step in the repeating action, the step of dividing the mobile stations into subsets is performed randomly to form several clustering versions and wherein the power allocation is obtained from the clustering version accordingly.

29. The method of claim 28, further comprising requesting that the base stations delay scheduling the mobile stations using the power allocation.

30. The method of claim 28, further comprising requesting that the base stations delay scheduling the mobile stations using the power allocation due to a delay in signaling to the base stations.

* * * * *